(12) United States Patent
Calder et al.

(10) Patent No.: US 10,613,707 B2
(45) Date of Patent: Apr. 7, 2020

(54) AUDITING ICONS VIA IMAGE RECOGNITION TO PROVIDE INDIVIDUALIZED ASSETS TO SOFTWARE PROJECT TEAMS

(71) Applicant: International Business Machines Corporation, Armonk, NY (US)

(72) Inventors: Cameron E. Calder, Round Rock, TX (US); Blake M. Helman, Austin, TX (US); Hyun K. Seo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 14/965,376

(22) Filed: Dec. 10, 2015

(65) Prior Publication Data
US 2017/0168676 A1 Jun. 15, 2017

(51) Int. Cl.
*G06F 3/0481* (2013.01)
*G06K 9/62* (2006.01)
(Continued)

(52) U.S. Cl.
CPC ........ *G06F 3/04817* (2013.01); *G06F 3/0481* (2013.01); *G06F 3/0482* (2013.01);
(Continued)

(58) Field of Classification Search
CPC ...... G06F 3/04817; G06F 3/0482; G06F 8/77; G06F 3/0481; G06F 8/20; G06F 8/34;
(Continued)

(56) References Cited

U.S. PATENT DOCUMENTS

| 6,003,039 A | 12/1999 | Barry et al. |
| 6,456,307 B1 * | 9/2002 | Bates .................... G06F 3/0481 715/779 |

(Continued)

OTHER PUBLICATIONS

GConvert "GConvert Online Help Manual", http://www.gdgsoft.com/gconvert/help/index.aspx?page=introduction.htm, published 2008, pp. 1-3. (Year: 2008).*

(Continued)

*Primary Examiner* — Tan H Tran
(74) *Attorney, Agent, or Firm* — Jeffrey S. LaBaw; Jack V. Musgrove (57) ABSTRACT

Individualized icon elements are provided to a development team implementing a user interface or other image content for a new software application. A computer system receives an electronic document representing an image mockup from a designer, and scans the electronic document to identify mock icons. The mock icons are matched to corresponding icons in a digital icon repository. Each icon in the repository has associated metadata such as file name, description, file format, location, etc. Icons may be available with different file formats. The corresponding icons are provided with associated metadata in a form which is selectable by a developer. Corresponding icons may be provided by displaying icon images with respective confidence values representing an estimated likelihood of matching. A desired icon can be selected for inclusion in an icon package, and thereafter be removed from the list of available icons in the icon repository for the current project.

12 Claims, 7 Drawing Sheets

(51) Int. Cl.
*G06F 9/44* (2018.01)
*G06F 3/0482* (2013.01)
*G06F 8/77* (2018.01)
*G06F 8/34* (2018.01)
*G06K 9/00* (2006.01)
*G06K 9/46* (2006.01)
*G06F 8/38* (2018.01)
*G06F 8/20* (2018.01)

(52) U.S. Cl.
CPC ............... *G06F 8/34* (2013.01); *G06F 8/38* (2013.01); *G06F 8/77* (2013.01); *G06K 9/00456* (2013.01); *G06K 9/4642* (2013.01); *G06K 9/4652* (2013.01); *G06K 9/6202* (2013.01); *G06F 8/20* (2013.01)

(58) Field of Classification Search
CPC .... G06F 8/38; G06K 9/6202; G06K 9/00456; G06K 9/4642; G06K 9/4652
See application file for complete search history.

(56) References Cited

U.S. PATENT DOCUMENTS

| | | | | |
|---|---|---|---|---|
| 6,476,834 | B1* | 11/2002 | Doval | G06F 9/451 |
| | | | | 715/863 |
| 8,296,808 | B2 | 10/2012 | Hardacker et al. | |
| 8,473,525 | B2 | 6/2013 | McIntyre et al. | |
| 8,667,539 | B2 | 3/2014 | Hartson et al. | |
| 2004/0135815 | A1* | 7/2004 | Browne | G06F 17/30274 |
| | | | | 715/810 |
| 2007/0011622 | A1 | 1/2007 | Chae et al. | |
| 2009/0295993 | A1 | 12/2009 | Chhokra | |
| 2009/0327940 | A1* | 12/2009 | Duncan | G06F 3/048 |
| | | | | 715/765 |
| 2011/0047517 | A1 | 2/2011 | Lee et al. | |
| 2014/0019484 | A1* | 1/2014 | Coppin | G06F 17/30256 |
| | | | | 707/772 |
| 2014/0280390 | A1* | 9/2014 | Bubash | G06F 16/166 |
| | | | | 707/821 |
| 2014/0316931 | A1* | 10/2014 | Selcuk | G06Q 30/0643 |
| | | | | 705/26.5 |
| 2014/0325435 | A1* | 10/2014 | Jung | G06F 3/04845 |
| | | | | 715/790 |
| 2015/0016719 | A1 | 1/2015 | Tam et al. | |
| 2015/0185995 | A1* | 7/2015 | Shoemaker | G06F 3/0484 |
| | | | | 715/708 |
| 2017/0061416 | A1* | 3/2017 | Morate | G06F 17/30259 |

OTHER PUBLICATIONS

Google, "Material icons guide" [online], retrieved on Dec. 2, 2015, from the Internet URL: https://google.github.io/material-design-icons/.

G.D.G. Software, "Scan folders for hidden icons" [online], retrieved on Dec. 2, 2015, from the Internet URL: http://www.gdgsoft.com/gconvert/help/icbrow.htm (2008).

Top Ten Reviews, "Icon Craft 4.1" [online], retrieved on Dec. 2, 2015, from the Internet URL: http://icon-editing-software-review.toptenreviews.com/icon-craft-review.html (Sep. 2011).

Labix Blog, "Xpresser—Python library for GUI automation with image matching" [online], retrieved on Dec. 2, 2015, from the Internet URL: http://blog.labix.org/2010/05/18/xpresser-python-library-for-gui-automation-with-image-matching (May 18, 2010).

AT&T Laboratories Cambridge, "Image Content-based Organisation and Navigation" [online], retrieved on Dec. 2, 2015, from the Internet URL: http://www.cl.cam.ac.uk/research/dtg/attarchive/permm/icon.html (2002).

Noun Project, "Icons for Everything" [online], retrieved on Dec. 2, 2015, from the Internet URL: https://thenounproject.com/.

Softonic, "Icon Scanner" [online], retrieved on Dec. 2, 2015, from the Internet URL: http://icon-scanner.en.softonic.com/ (see description top of p. 4).

IBM Design Language, "Icon Library" [online], retrieved on Dec. 2, 2015, from the Internet URL: http://www.ibm.com/design/language/resources/icon-library.

\* cited by examiner

AUDITING ICONS VIA IMAGE RECOGNITION TO PROVIDE INDIVIDUALIZED ASSETS TO SOFTWARE PROJECT TEAMS

BACKGROUND OF THE INVENTION

Field of the Invention

The present invention generally relates to software development, and more particularly to a method of providing image content which may be used as an icon during new software implementation.

Description of the Related Art

Modern computer users are familiar with icons and other interactive objects used in various computer programs such as operating systems and software applications. Many icons are used in the same or similar visual form by different programs to initiate the same basic routines. For example, an icon having a pair of scissors is often used as a "cut" command, i.e., removing content from a file or input field location and placing it in a temporary location (e.g., a "clipboard") from which the content can subsequently be copied into another file or location. Icons are frequently co-located in a menu, toolbar or ribbon of an application, but can appear anywhere within a graphical user interface, with or without accompanying text.

The number and nature of these icons is virtually limitless; one collection of commonly used icons may be found at internet address www.ibm.com/design/language/resources/icon-library. That library categorizes the icons into action-based, object-based, formatting, and glyphs, but these designations are not exclusive. Other icon libraries are publically available including some that are text-searchable. The Noun Project (internet address thenounproject.com) allows users to directly import a link for an icon into certain applications by dragging-and-dropping the icon from a web browser. While icons essentially represent an image, they may be considered in the context of a computer system without reference to graphical features, e.g., by manipulating the file or other computer-readable data which is representative of the visual image without actually displaying that image. Pure text without graphical elements may also be considered an icon in certain circumstances. Icons can be stored in a common file or as unitary files in a variety of formats including scalable vector graphics (SVG), portable network graphics (PNG), joint photographic experts group (JPG), or Microsoft icon format (ICO).

When designers create new computer programs, they often want to use icon images that are already known or are otherwise in use for actions or objects that may have a universal meaning. They can delve into icon libraries or repositories to locate familiar icons. Icons may also be retrieved in other manners, such as from sprite sheets. A sprite sheet is basically a single file or image which contains a set of multiple smaller images, usually laid out in a tile pattern. Sprites allow graphical objects such as icons to be handled separately from the memory bitmap of a video display, simplifying the rendering process. Most computer files have specific icons associated with them, often embedded, particularly with executable files (EXE files), library files such as dynamic link libraries (DLLs), and display objects such as animated cursor files. Some of these icons may be hidden, i.e., they do not show up from a normal display of the file or object, but they can be revealed using an icon extraction tool or via appropriate coding in an application. Designers can also craft their own image libraries for custom icons. The custom icons can be created from scratch or converted from some other source and imported.

A designer can copy an icon from one of these existing sources into a mockup of a graphical user interface for a proposed new software package, or may simply sketch a representation of the icon according to the designer's recollection or whim and import this sketch into the mockup. The mockup may not actually contain the icon as a separate object, e.g., the mockup might be a bitmap screenshot or even a scan of a hardcopy printout. When the proposed design is handed off to the development team to implement the code for the program, the developer becomes responsible for obtaining the correct or appropriate icon image and associating it with the object indicated in the mockup in order to carry out the designer's intent.

SUMMARY OF THE INVENTION

The present invention in various embodiments is generally directed to a method, system or program product for providing individualized icon elements by receiving an electronic document in a computer system wherein the electronic document represents an image mockup, scanning the electronic document to identify at least one mock icon therein, matching the mock icon to one or more corresponding icons which are available in a digital icon repository wherein each icon in the repository has associated metadata, and in response to this matching, providing the one or more corresponding icons with the associated metadata to an output device of the computer system in a form which is selectable by a user. The output device can be a display device and the corresponding icons are provided by displaying images for the corresponding icons on the display device with respective confidence values representing an estimated likelihood of matching the mock icon. In one implementation the associated metadata includes at least a file name, a description, a file format, and a location. Icons may be available with different file formats in the icon repository. A desired one of the corresponding icons can be selected for inclusion in an icon package. The selected icon can thereafter be removed from the list of available icons in the icon repository.

The above as well as additional objectives, features, and advantages in the various embodiments of the present invention will become apparent in the following detailed written description.

BRIEF DESCRIPTION OF THE DRAWINGS

The present invention may be better understood, and the numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

When a design team creates new software, icons are heavily involved in the user interface. Developers can sometimes utilize incorrect icons provided by the designers, even if mockups of the interface are provided. It can also be difficult for developers to procure the proper icon for a particular implementation, because selection of the correct icon involves many factors such as image format, dimensions, resolution, color, etc. It would, therefore, be desirable to devise an improved method of providing available icons to a developer which more accurately correspond with the designer's intent. It would be further advantageous if the method could easily be implemented across a wide spectrum of different developer tools.

The present invention in its various embodiments achieves these objectives by allowing a user (e.g., a front-end software developer) to scan a visual representation of the proposed software user interface, such as prototype or mockup image, to recognize the icons utilized and provide an organized asset list of matching icons recognized from an existing icon repository. The available icons can be used independently or can be integrated into other formats such as a sprite system depending upon implementation. This approach solves one of the biggest impediments of software user interface design and development challenges which encompass both workflow and communication issues.

Figure 1:
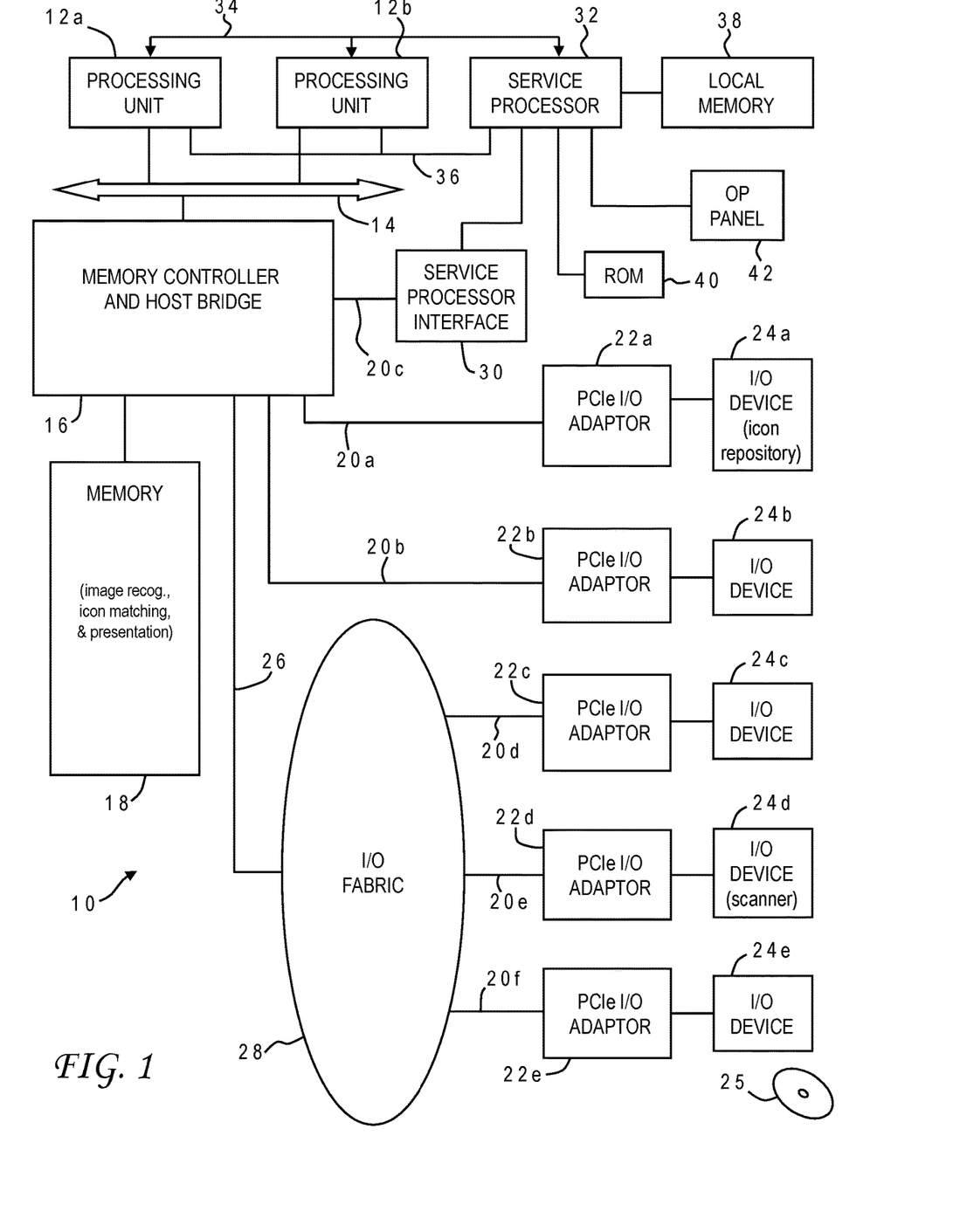
FIG. 1 is a block diagram of a computer system programmed to carry out image recognition and icon matching in accordance with one implementation of the present invention.

With reference now to the figures, and in particular with reference to FIG. 1, there is depicted one embodiment 10 of a computer system in which the present invention may be implemented to carry out image recognition and icon matching for provision of available icons to a developer. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention such as image recognition code and icon matching code. MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit design application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for an icon matching process to manage the development of user interfaces for new computer programs. Accordingly, a program embodying the invention may include conventional aspects of various software development tools, and these details will become apparent to those skilled in the art upon reference to this disclosure.

Figure 2A:
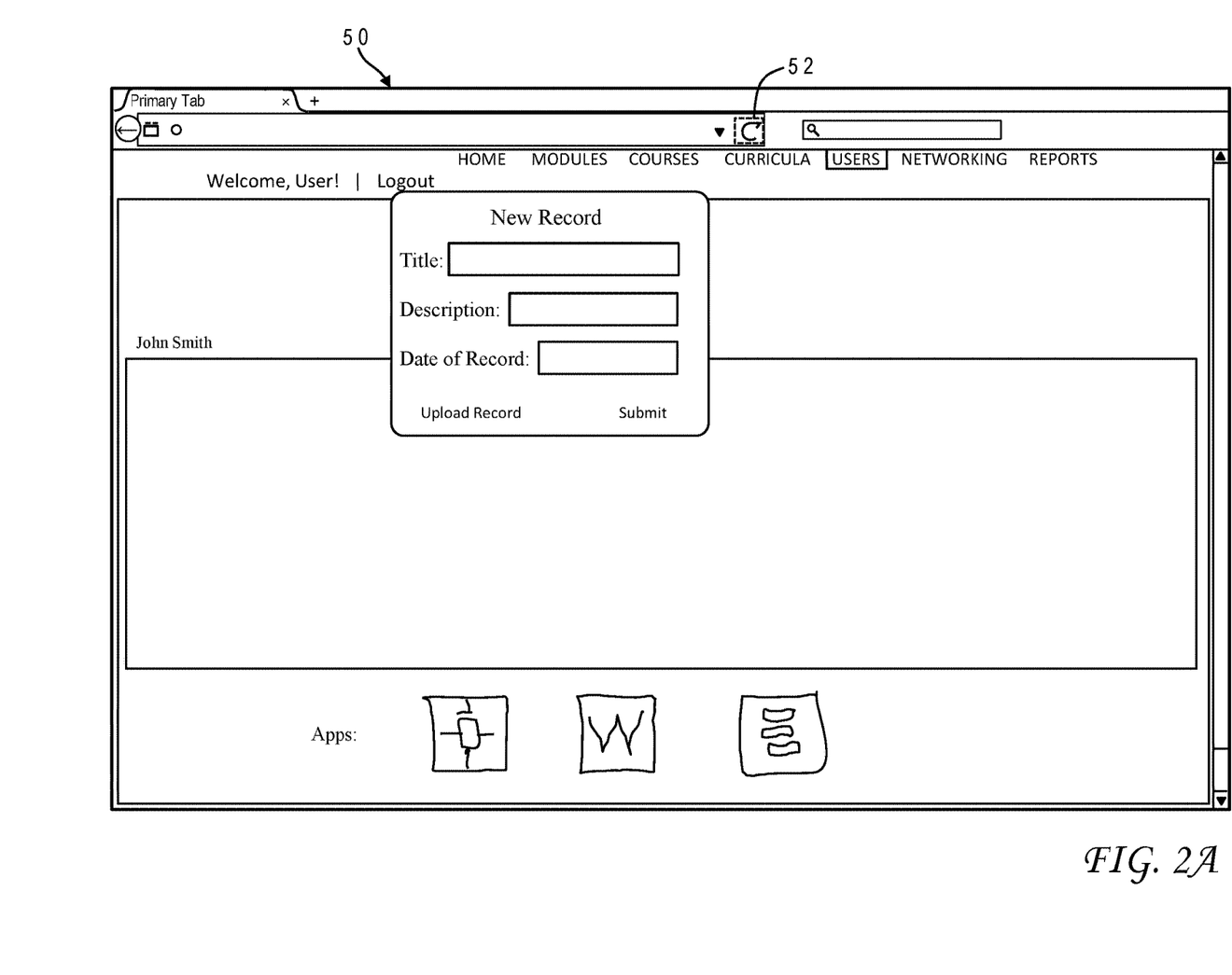
FIGS. 2A-2C are screenshots of a designer mockup for a proposed computer program which includes multiple icon images, illustrating icon identification via background normalization and gridding with different pixel sizes in accordance with one implementation of the present invention.

Referring now to FIG. 2A, there is depicted an example of a mockup 50 for a user interface of a proposed new software application. Mockup 50 may include several conventional features such as a parent window, child windows, pop-up menus, dialog boxes, etc. Any of these features may have embedded therein one or more mock icons including graphical symbols or textual symbols. The mock icons are intended to be interactive in some sense, e.g., selectable by various means such as using the "tab" key of a computer keyboard to move between different areas of the user interface or clickable by means of a graphical pointing device such as a mouse, although the interactive nature may be restricted under certain conditions, e.g., requiring administrative privileges.

While there are no limits on the particular size or shape of an icon, they are usually intended to be rectangular or square in pixel measurements, e.g., 16×16, 24×24, 32×32, 48×48, or 64×64. A mock icon can be an exact matching digital icon from an existing source of icons which is electronically copied and pasted into the mockup user interface, and FIG. 2A includes many such exact duplicates. A mock icon can also be something that is as crude as a hand-drawn sketch but embedded in a larger image along with other icons, as seen by the three larger icons at the bottom of FIG. 2A next to the "Apps:" indicator. The mockup user interface can be recorded via a screen capture or equivalent (print screen, screenshot), originally created in a bitmap format by the designer, or can be optically scanned from a hard copy printed out by the designer. The mockup user interface as well as the mock icons can be in color, black-and-white, or grayscale.

User interface mockup 50 can be provided as an electronic document to a novel development tool used by a software developer whose job it is to construct appropriate code for implementing the new program. This development tool may be loaded in a computer system such as computer system 10 of FIG. 1. Computer system 10 may receive mockup 50 via any of the input/output devices or a network device; alternatively, computer system 10 may include a scanner peripheral device which performs optical scanning of a hardcopy image of the mockup.

Once the mockup image is loaded into the computer system memory (e.g., as a bitmap), the development tool proceeds to analyze the image and audit any icons present. This auditing process includes two basic steps, image recognition and icon matching. Image recognition can be conventional or use additional new features as disclosed herein. Image recognition can be carried out in at least three general ways: background normalization, image partitioning, or manual identification. Background normalization is a known technique wherein objects that are different from their background are detected. The background color or style of an image or portion thereof is used as a comparator and any harsh differences between the background and other pixel color values are used to define a perimeter around an object. The dashed box 52 in FIG. 2A illustrates how background normalization might be used to detect a "refresh" mock icon that has a semicircular curve with an arrowhead pointed to the right.

Figure 2B:
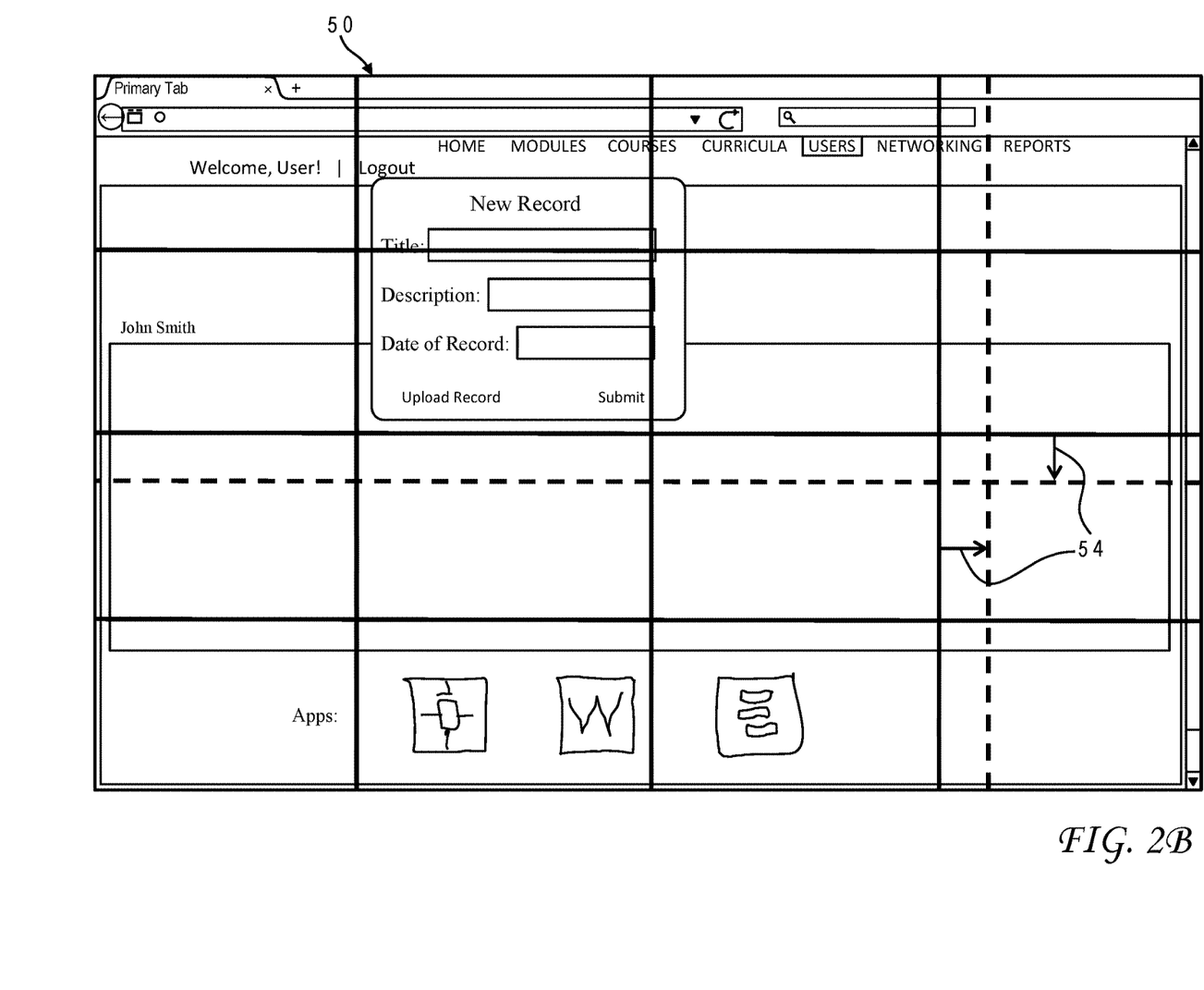
Figure 2C:
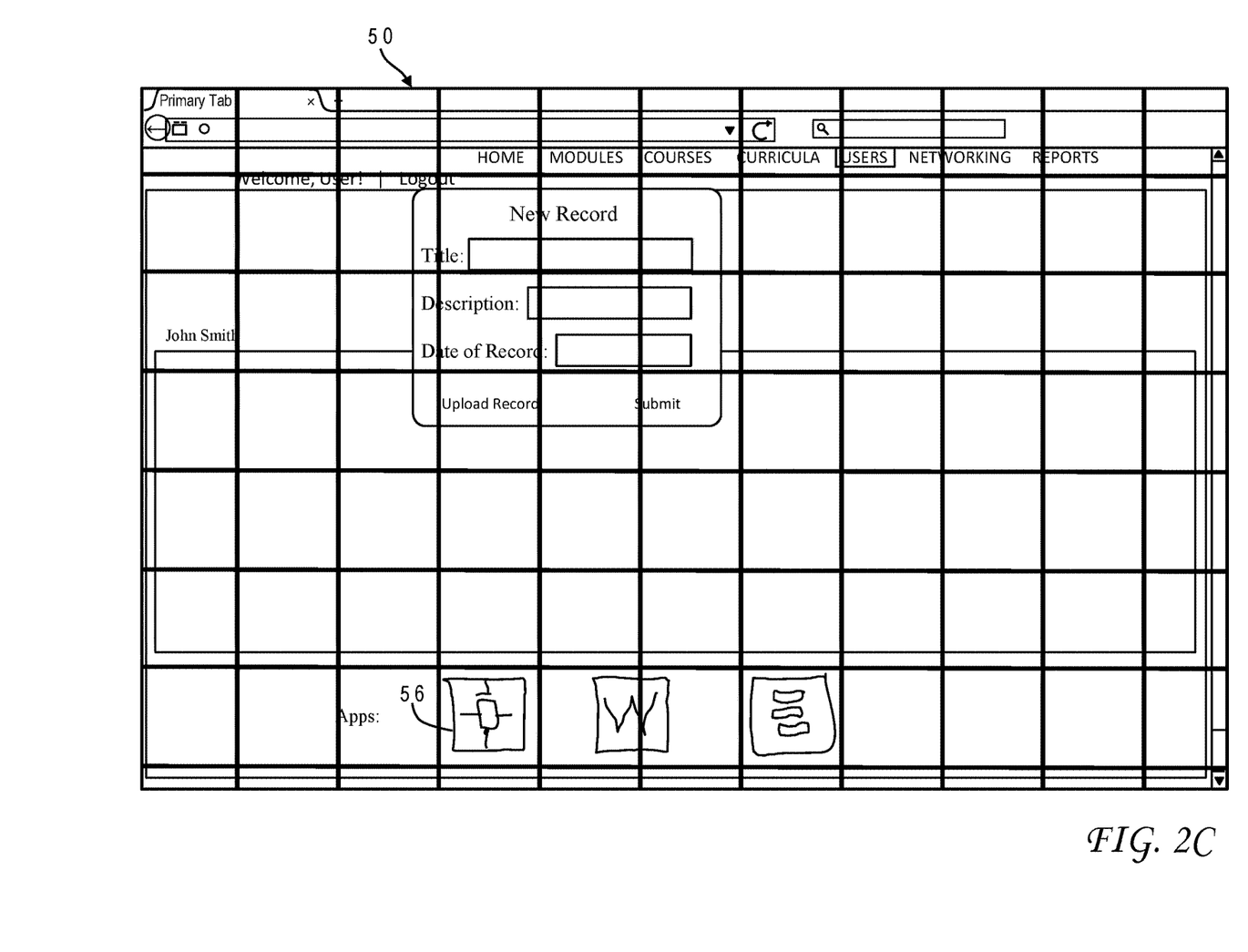

Image partitioning is also a generally known technique wherein an image is divided into tiles or grids of various sizes and positions, and any sub-image contained in a grid can then be compared to existing images. FIG. 2B shows how the image mockup 50 can be divided into a plurality of grids. The grid boundaries can be shifted as indicated by arrows 54. The grid size can additionally be varied as seen in FIG. 2C which shows smaller grids. In this manner, a mock icon such as the electronics icon 56 is eventually contained within a single grid, facilitating later icon matching, although it is not necessary that the mock icon be wholly contained within a grid since there are existing image recognition programs that have the ability to recognize partially scanned images, so designs created without a grid structure can still be fed to the icon matching algorithm(s).

The grid size (in pixels or other length units) can vary considerably. The grid sizes can be automatically provided, manually designated, or some combination of the two. For example, a partitioning algorithm can be written so that it always scans the given image five different times using 8×8, 16×16, 24×24, 32×32 and 48×48 pixel grids. Alternatively, the designer can provide a minimum grid size and a maximum grid size (in pixels), and the partitioning routine can loop through every integer value between the minimum and maximum sizes. The partitioner can alternatively use a specified number of loops within the range designated by the minimum and maximum; for example, the designer could provide a minimum grid width of 8 pixels, a maximum of 64 pixels, and nine loops (iterations), resulting in grid sizes of 8×8, 15×15, 22×22, 29×29, 36×36, 43×43, 50×50, 57×57, and 64×64. Instead of designating the number of loops, the designer could designate the spacer between grid sizes, e.g., 2 pixel intervals, so the grid sizes would be 8×8, 10×10, 12×12, and so on. In particular the partitioner can use a grid size or sizes based on the pixel sizes of icons that have already been uploaded or are available in a reference icon repository, e.g., if the available icons are 48×48 pixels then a 48×48 grid size is preferable, among others.

Mock icon areas in the proposed user interface can also be identified manually, such as using a simple box tool which the developer manipulates with the computer mouse to form a rectangle around a desired icon in the mockup, as displayed on a monitor of the computer system. The designer can alternatively be the one to create such markups. In such case computer system 10 can skip the image recognition step and automatically proceed to icon matching using the indicated mock icon image areas.

Figure 3:
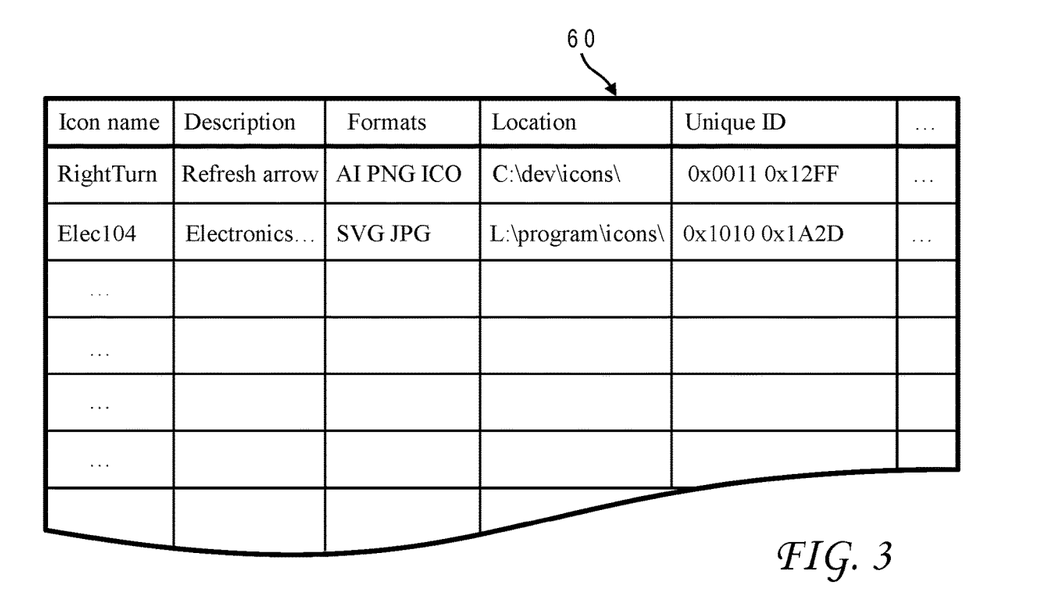
FIG. 3 depicts records within an icon repository which include icon identifiers as well as associated metadata in accordance with one implementation of the present invention.

Once images of potential icons have been extracted from the user interface mockup, those images can be further examined by computer system 10 to see if they correspond with existing icons. The existing icons may reside, for example, in an icon repository stored in an I/O device of computer system 10. FIG. 3 shows record sets for one implementation of such an icon repository 60. The icon repository may thus be considered to include the icons themselves (stored individually or collectively in one or more files) as well as the associated metadata in the record sets, although these two features might not be co-located, e.g., the record sets with metadata could be stored locally on computer system 10 and the actual icon files could be remotely stored at a network location. Each record can include an icon name field, a description field, a formats field, and a location field, a unique identifier (ID) field, as well as other fields not shown. Further to the example of FIGS. 2A-2C, the repository of FIG. 3 includes a first record set for a refresh icon, and a second record set for an electronics icon. For the first record set, the icon name (file name) is "RightTurn", its description is "Refresh arrow", that icon's available formats are Adobe Illustrator (AI), portable network graphics (PNG), and Microsoft icon (ICO), the icon file is stored at "C:\dev\icons\" (on a local storage device), and its unique ID is "0x0011 0x12FF". For the second record set, the icon name is "Elec104", its description is "Electronics components", that icon's available formats are scalable vector graphics (SVG) and joint photographic experts group (JPG), the icon file is stored at "L:\programs\icons\" (on a remote storage device), and its unique ID is "0x1010 0x1A2D".

While FIG. 3 shows only five specified fields for each icon record set, those skilled in the art will appreciate that the icon metadata may include a wide variety of information including but not limited to exchangeable image file format (EXIF) data, whether the file is a smart/vector format such as encapsulated postscript (EPS), Bohemian Coding Sketch (SKETCH) or AI, SQLLite or other structured data (for example, expediting the scan of the mockup by gathering the icons from the materials manifest of any smart files), instructions or guidelines on how to use the icon, examples of where the icons are being used, available sizes, code implementation guidance, upload date, author, sounds, etc. While a conventional icon repository might be used, the information could alternatively be customized as part of an icon repository creation process to build a unique, proprietary repository from a variety of sources. As part of that process designers can upload various icon image files along with associated metadata. Any of this metadata can be retrieved from the icon repository and presented to a user (developer) as explained further below. An automated tool can be used to gather icons, e.g., from the Internet, and mark them with associated metadata. The tool can, for example, crawl through sites located on the World Wide Web such as by cycling through IP addresses, investigating links on previously discovered web sites, and utilizing existing network search engines. Identification of icons and parsing their metadata may become easier with advances in web technology, among other things, a semantic markup (nomenclature) model.

Figure 4:
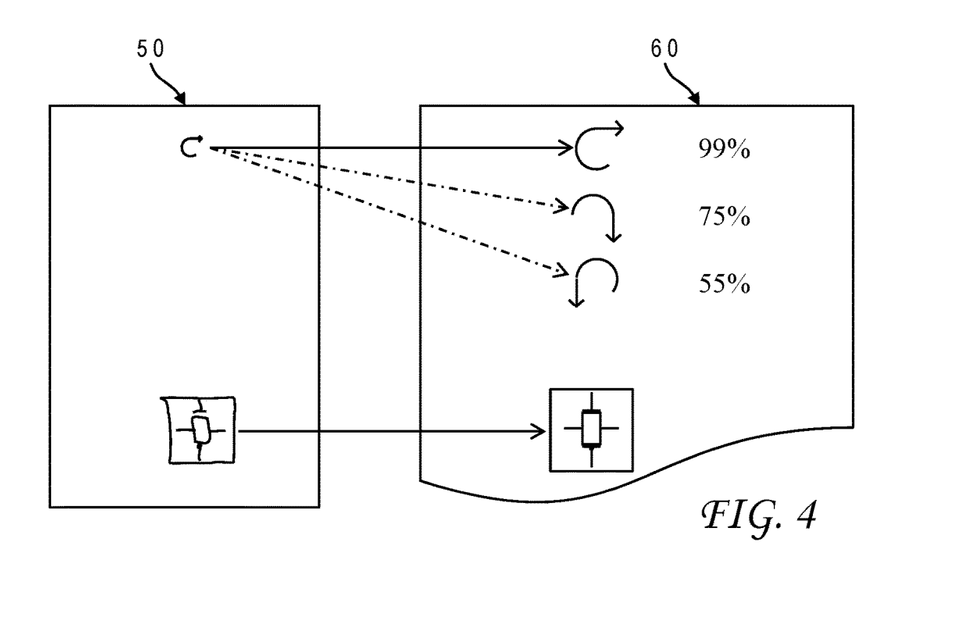
FIG. 4 is a pictorial representation of icon matching in accordance with one implementation of the present invention including provision of matching confidence values for different possible icon matches.

Matching of a mock icon to an available icon in the icon repository may be carried out in a variety of ways, particularly (but not necessarily) using the same computer system 10 which performed the image scanning of the UI mockup. The matching algorithm may be conventional, such as reverse image searching. Pattern matching algorithms may have various parameters that can be tuned such as resolution, fonts, themes, etc. Any discrepancies or scan errors can be alerted to the user, and instead of a complete connection to an icon the user can be presented with the most relevant matches as seen in FIG. 4. The presentation of the candidate matches can include a relevance or confidence factor or other value indicating the estimated likelihood of a match. The closeness of a candidate match can be quantified according to a variety of methods. For example, image diffs can be used to identify differences between two images (looping over each pixel in the first image and comparing it to the pixel in the same location in the second image). The image diffs may be used by a two-dimensional image metric, including a 2-D fuzzy matching algorithm. Machine-learning methods may be implemented to make the matching system smarter as searches go on. In the example of Figure, computer system 10 has identified three possible icon matches for the refresh mock icon in mockup 50, each of these being a turn arrow but with different orientations. The most likely match has been given a 99% confidence rating, the next most likely match has been given a 75% confidence rating, and the least likely match has been given a 55% confidence rating. In FIG. 4 computer system 10 has found only one candidate match for the electronics mock icon.

Figure 5:
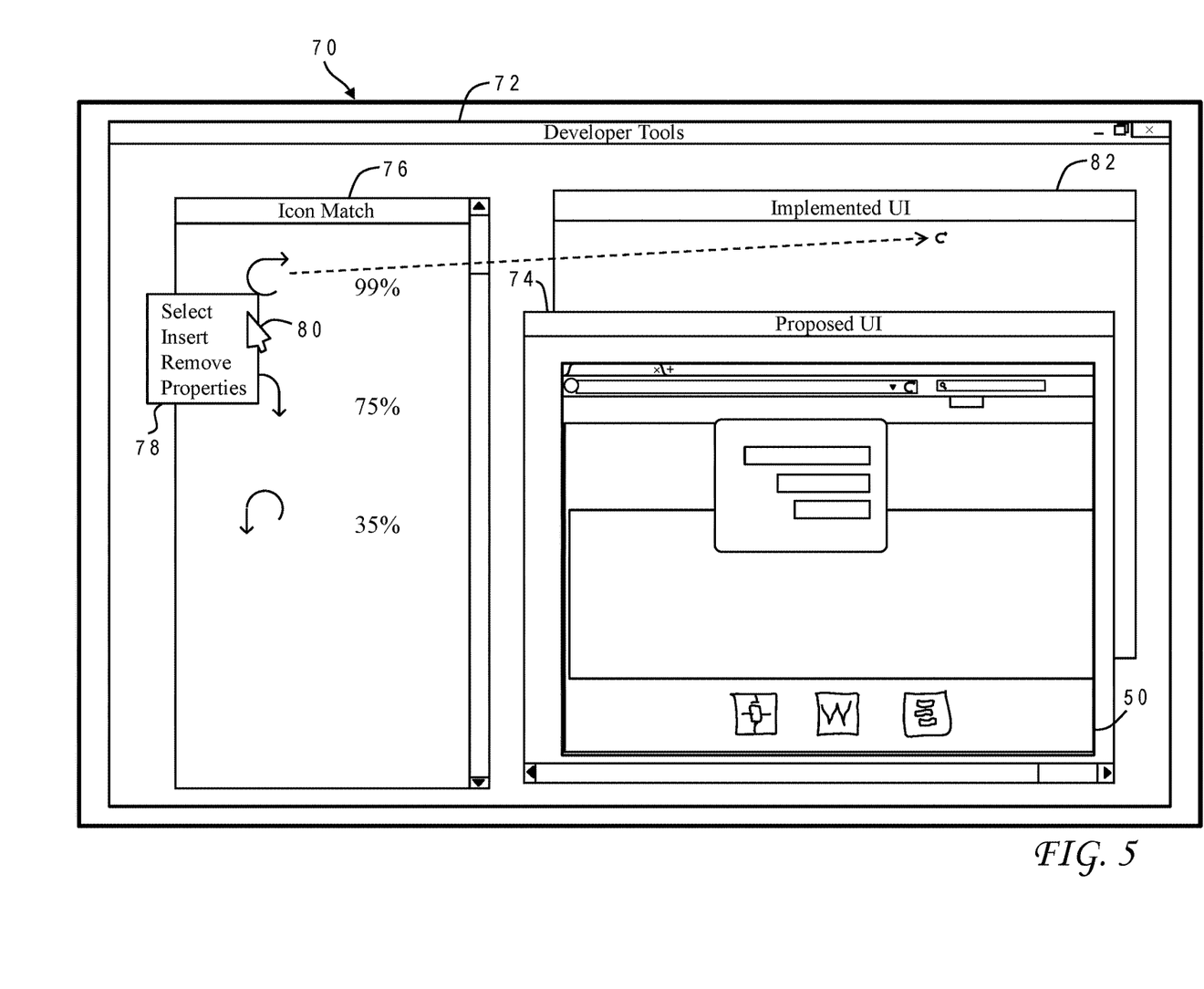
FIG. 5 is an elevational view of a user interface for developer software in accordance with one implementation of the present invention showing how icon matching results may be presented to a developer for inclusion in a new computer program.

Each of the grids formed during image partitioning of the UI mockup (or other areas defined manually or via background normalization) can be cross-referenced against each icon in the icon repository. Any candidate matches are presented to the developer via an asset exporter. FIG. 5 illustrates an example of a user interface for a developer tool adapted for this purpose, as displayed on a monitor or other video device 70 of computer system 10. The user interface includes a parent window 72 for the developer tool, a child window 74 depicting the mockup bitmap, and a child window 76 for the asset exporter. In this implementation child window 76 visually displays the candidate icon matches and their confidence values, for example the three turn arrows seen in FIG. 4. The desired icon can be selected or otherwise manipulated in a variety of ways. In one implementation the user can cause a pop-up menu 78 to be displayed by right-clicking the mouse when the mouse pointer 80 is hovering over a given candidate icon. Pop-up menu 78 may further allow the user to select the icon, to insert the icon, i.e., into the code or icon package for the intended new program, or to remove the icon from the available list of icons for this project. Pop-up menu 78 may also allow the user to view the properties of the selected icon, such as the associated metadata. The user can further be allowed to perform a drag-and-drop operation with the computer mouse to add the icon to an in-development version of a user interface for the program to be implemented, which may be displayed in another child window 82. Inserting an icon can also incorporate the icon's metadata into the development code. Other customizations may be made to how the extracted icons are delivered.

Design teams and development teams often utilize vastly different tools to code and/or design, which can create problems when implementing a new UI. The present invention can alleviate this problem since it allows a common image format to be exported by existing tools while retaining the ability to export icons in the preferred method of the user.

In one example of a use case, the design team already has a repository of icons, and a list of the icons with metadata attached to them. The designers create a mockup of a page for a website/web-app project, and scan the mockup into a computer program implementing the present invention. That program scans the mockup image for icons, and cross-references them against the existing icon repository. Results of the cross-referencing are presented to the designers who can then link the results to the developers. The developers examine the scan, and export all the recognized icons by the icon matching routine in a image format of their preference that will be packaged in a zip/packaged file (or generate a sprite file of the icons). The developers can subsequently integrate the icons into their project.

In another example of a use case, the developers initially receive prototypes of a user interface or other image mockup from the designers, and the developers themselves scan the images to the implementing computer program. The program creates a list of mock icons that match icons in an existing icon repository and provides the list to the development team in an electronic format. Developers go through a selection process in which they can check off (enable/disable) the icons they want to export because some of the icons have already been exported prior to the introduction of the scan to the team. The developers can subsequently integrate the icons into their project.

Figure 6:
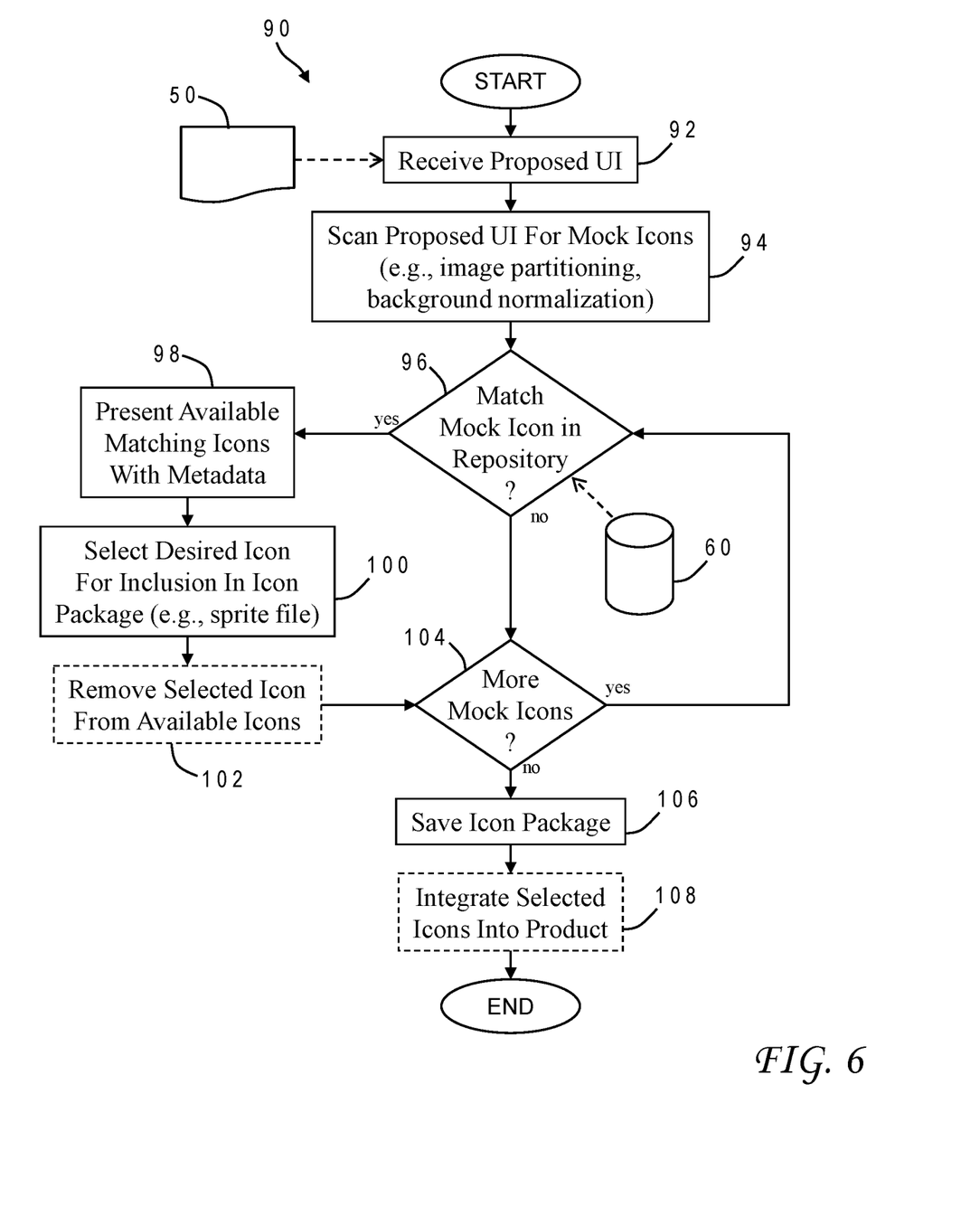
FIG. 6 is a chart illustrating the logical flow for an icon matching process in accordance with one implementation of the present invention.

The present invention may be further understood with reference to the chart of FIG. 6 which shows the logical flow for an image scanning and icon matching process 90 in accordance with one implementation of the present invention. The process begins with a computer system such as computer system 10 receiving a proposed user interface 50 or other image representing a graphical feature of a proposed new program (92). The image is then scanned to identify potential mock icons (94). Each mock icon is compared to icons in an icon repository 60 to find any candidate matches (96). If a match is found, it is presented with associated metadata to the user (98), who can then selected the desired icon for inclusion in an icon package (100). One added to the package, the selected icon may be removed from further availability (102). If there are more mock icons remaining in the scanned UI (104), the process iterates at box 96. Once all mock icons have been processed, the icon package is saved (106). The developer can later integrate the selected icons into the final product embodying the new program (108).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while only one specific user interface mockup is depicted in the figures, those skilled in the art will appreciate that the invention can be applied to any user experience (UX) images in a proposed design without limitation, e.g., splash screens, menus or sub-menus, side ribbons or stand-alone toolbars, help screens, etc. It is therefore contemplated that such modifications can be made without departing from the spirit or scope of the present invention as defined in the appended claims.

What is claimed is:

1. A method of providing individualized icon elements comprising:
    receiving an electronic document in a computer system, the electronic document containing an image mockup, the image mockup being a nonfunctional visual representation of a graphical user interface for a proposed new software program, by executing first instructions in the computer system;
    scanning the image mockup to identify at least one mock icon therein, the mock icon having an intended functionality relating to initiation of a computer program routine as part of the new software program, by executing second instructions in the computer system;
    matching the mock icon to a plurality of corresponding icons which are available in a digital icon repository, the repository including a plurality of computer program icons each having an associated functionality, each computer program icon in the repository having associated metadata, by executing third instructions in the computer system;
    in response to said matching, displaying images for each of the plurality of corresponding icons with the associated metadata on a display device of the computer system in a form which is selectable by a user, by executing fourth instructions in the computer system, wherein the plurality of corresponding icons are displayed with respective confidence values representing an estimated likelihood of matching the mock icon;
    receiving a user selection of a desired one of the plurality of corresponding icons for inclusion in an icon package, by executing fifth instructions in the computer system; and
    using the icon package to construct appropriate code to implement the desired icon with the intended functionality in the new software program, by executing sixth instructions in the computer system.

2. The method of claim 1 wherein the associated metadata includes at least a file name, a description, a file format, and a location.

3. The method of claim 1 wherein at least one of the plurality of corresponding icons is available with different file formats in the icon repository.

4. The method of claim 1, further comprising removing the desired icon from icons which are available in the icon repository in response to said selecting, by executing sixth instructions in the computer system.

5. A computer system comprising:
    a display device;
    one or more processors which process program instructions;
    a memory device connected to said one or more processors; and
    program instructions residing in said memory device for providing individualized icon elements by receiving an electronic document containing an image mockup wherein the image mockup is a nonfunctional visual representation of a graphical user interface for a proposed new software program, scanning the image mockup to identify at least one mock icon therein wherein the mock icon has an intended functionality relating to initiation of a computer program routine as part of the new software program, matching the mock icon to a plurality of corresponding icons which are available in a digital icon repository wherein the repository includes a plurality of computer program icons each having an associated functionality and each computer program icon in the repository has associated metadata, responsive to the matching, displaying images for each of the plurality of corresponding icons with the associated metadata on said display device in a form which is selectable by a user, wherein the plurality of corresponding icons are displayed with respective confidence values representing an estimated likelihood of matching the mock icon, receiving a user selection of a desired one of the plurality of corresponding icons for inclusion in an icon package, and using the icon package to construct appropriate code to implement the desired icon with the intended functionality in the new software program.

6. The computer system of claim 5 wherein the associated metadata includes at least a file name, a description, a file format, and a location.

7. The computer system of claim 5 wherein at least one of the plurality of corresponding icons is available with different file formats in the icon repository.

8. The computer system of claim 5 wherein said program instructions further include removing the desired icon from icons which are available in the icon repository in response to said selecting.

9. A computer program product comprising:
    a computer readable storage medium; and
    program instructions residing in said storage medium for providing individualized icon elements by receiving an electronic document in a computer system wherein the electronic document contains an image mockup wherein the image mockup is a nonfunctional visual representation of a graphical user interface for a proposed new software program, scanning the image mockup to identify at least one mock icon therein wherein the mock icon has an intended functionality relating to initiation of a computer program routine as part of the new software program, matching the mock icon to a plurality of corresponding icons which are available in a digital icon repository wherein the repository includes a plurality of computer program icons each having an associated functionality and each computer program icon in the repository has associated metadata, responsive to the matching, displaying images for each of the plurality of corresponding icons with the associated metadata on a display device of the computer system in a form which is selectable by a user, wherein the plurality of corresponding icons are displayed with respective confidence values representing an estimated likelihood of matching the mock icon, receiving a user selection of a desired one of the plurality of corresponding icons for inclusion in an icon package, and using the icon package to construct appropriate code to implement the desired icon with the intended functionality in the new software program.

10. The computer program product of claim 9 wherein the associated metadata includes at least a file name, a description, a file format, and a location.

11. The computer program product of claim 9 wherein at least one of the plurality of corresponding icons is available with different file formats in the icon repository.

12. The computer program product of claim 9 wherein said program instructions further include removing the desired icon from icons which are available in the icon repository in response to said selecting.

\* \* \* \* \*